Oct. 9, 1934.  F. S. STICKNEY  1,976,584
ELECTRICAL INSTRUMENT
Filed July 26, 1933

WITNESSES:
Leon J. Taza
F. T. Hicks

INVENTOR
Fernald S. Stickney.
BY
ATTORNEY

Patented Oct. 9, 1934

1,976,584

UNITED STATES PATENT OFFICE 1,976,584

ELECTRICAL INSTRUMENT

Fernald S. Stickney, West Orange, N. J., assignor to Westinghouse Electric & Manufacturing Company, East Pittsburgh, Pa., a corporation of Pennsylvania Application July 26, 1933, Serial No. 682,208

7 Claims. (Cl. 171—34)

My invention pertains to calibrating means for electrical instruments and more particularly to means for calibrating direct current instruments of the permanent magnet type.

Previous arrangements for calibrating direct current electrical instruments of the permanent magnet type have been very unsatisfactory and inconvenient. Calibrating adjustments had to be made in service by removing the cover of the instrument and either adjusting the resistance wire, torsion spring, or a magnetic shunt. The necessity for removing the instrument cover made it impossible to calibrate the instrument without removing the instrument from the panel.

Furthermore, many direct current instruments being unshielded will read low when mounted on a steel panel. Hence, it is not only inconvenient to remove the instrument from the panel and the cover from the instrument before calibrating, but the accuracy of the calibration will be disturbed when the cover is replaced and the instrument remounted.

It is accordingly an object of my invention to provide calibrating means for electrical instruments such that they may first be mounted and covered in the usual manner and thereafter calibrated conveniently and quickly in normal operating position.

A futher object of my invention is to provide a magnetic instrument shunt which can be easily adjusted with a screw driver from the outside of the instrument without removing the instrument from the panel.

Another object of my invention is to provide a magnetic shunt which may be conveniently adjusted and rigidly secured in adjusted position without disturbing the accuracy of the adjustment.

The invention itself, however, both as to its organization and its method of operation, together with additional objects and advantages thereof, will best be understood from the following description of a specific embodiment, when read in conjunction with the accompanying drawing, in which.

Figure 1:
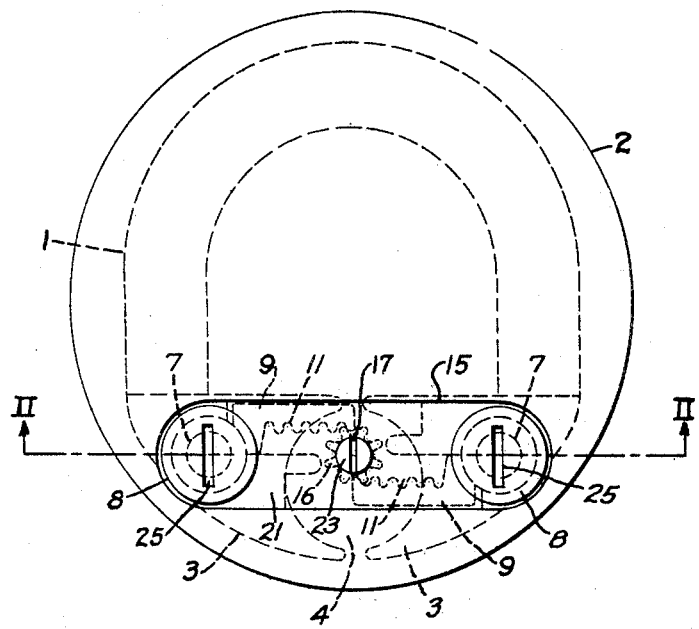
Figure 1 is a rear elevational view showing the base of a direct current instrument provided with calibrating means in accordance with my invention.
Figure 2:
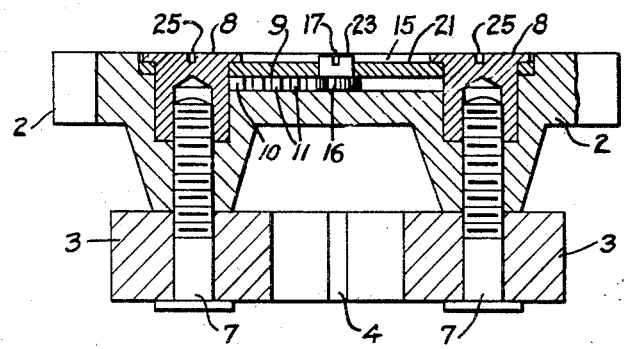
Fig. 2 is a sectional view taken on line II—II thereof.
Figure 3:
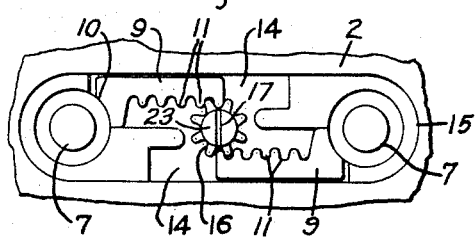
Fig. 3 is a detail view showing the elements in the slot in the base with the cover plate removed.
Figure 4:
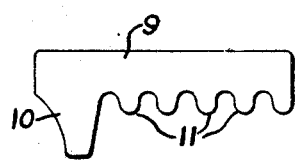
Fig. 4 is an enlarged detail view showing one of the flux shunting members.

Referring more specifically to the drawing, Fig. 1 represents a conventional direct current instrument comprising a permanent magnet 1 mounted upon a base 2 which may be moulded of any suitable non-magnetic material. The poles of the permanent magnet are provided with curved pole tips 3 which are adapted to provide an enclosed circular air gap space 4 with a constant uniform magnetic field within which a conventional instrument rotor (not shown) may be mounted on jeweled bearings (not shown) in the well known manner. A pair of threaded studs 7, extend through the pole tips 3 of the magnet and the associated base 2. Threaded retaining caps 8 screw onto the ends of the studs 7 into the base 2, flush with the rear surface. The studs 7 and the retaining caps 8 are of steel or other magnetic material.

In order to provide for adjusting the sensitivity of the instrument, flux shunting members 9 are movably mounted between the retaining caps 8 on the steel studs 7 for shunting more or less of the flux away from the air gap 4 and accordingly varying the flux density therein.

Each flux shunting member 9 is made of some suitable magnetizable material such as steel or soft iron and is provided at one end with a curved portion 10 which is adapted to fit snugly against one of the caps. An elongated portion of each flux shunting member is provided with rack teeth 11. The flux shunting members 9 are slidably supported and mounted in separate grooves 14 provided in a recess 15 which extends between and around the retaining caps 8 on the studs in the back surface of the base 2. A pinion 16 of magnetic material is pivotally mounted in an interconnecting space between the grooves 14 and its teeth operatively engage the rack teeth 11 on the flux shunting members to project them toward, or to retract them from, the retaining caps in accordance with the direction of rotation imparted to the pinion. A slot 17 is provided on the end 23 of the pinion 16 for receiving a screw driver to facilitate adjusting the shunting members 9.

A cover plate 21 of non-magnetic material, such as brass, is mounted on and between the studs 7 to cover the recess 15 and hold the flux shunting members 9 and the pinion 16 in their respective operative positions. An orifice in the middle of the cover plate 21 serves as a bearing for pivotally supporting the end 23 of the pinion. The ends of the cover plate 21 have apertures through which the retaining caps 8 screw onto the ends of the threaded studs to secure the cover plate 21 in place over the recess 15. When the retaining caps 8 are turned down tightly on the studs 7 the cover plate 21 firmly grips the elements in the recess and holds them in their adjusted positions. Each of the retaining caps is provided with a slot 25 to receive a screw driver whereby they may be conveniently adjusted. When the instrument is mounted upon a panel suitable holes are provided in alignment with the pinion and the studs in the instrument.

By merely inserting a screw driver the retaining caps 8 may be loosened and the pinion 16 rotated to move the flux shunting members 9 until the desired flux density is obtained between the pole tips 3 of the instrument. By then tightening the retaining caps 8 on the studs the cover plate 21 is clamped down to firmly secure the elements in their exact adjusted positions without danger of disturbing the adjustment.

It will be apparent that I have provided flux shunting means for electrical instruments, which may be adjusted while the instrument remains covered and mounted in its normal operating position whereby the calibration of the instrument may be accomplished quickly and conveniently and without the accuracy of the adjustment being thereafter disturbed.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination in an electrical instrument a permanent magnet, a non-magnetic base, a recess in the back surface of said base, grooves in said recess, a pair of flux shunting members slidably disposed in said grooves, rack teeth on said shunting members and a pinion operatively engaged therebetween for conveniently adjusting the position of said members relative to the pole portions of said magnet.

2. In combination in an electrical instrument a U-shaped permanent magnet, a non-magnetic base, a recess in the back surface of said base, grooves in said recess, a pair of flux shunting members slidably disposed in said grooves, rack teeth on said shunting members and a pinion operatively engaged therebetween for conveniently adjusting the position of said members relative to the pole portions of said magnet, a cover plate on said recess, adjustable fastening means for securing said cover plate over said recess whereby the slidable members may be clamped firmly in place, screw driver receiving slots in said fastening means and said pinion whereby the plate may be conveniently released and the slidable members adjusted by means of a single implement.

3. In combination in an electrical instrument a U-shaped permanent magnet, a non-magnetic base, threaded studs of magnetic material extending through the pole portions of said magnet and the base, a recess in the back surface of said base extending between and around said studs, a pair of flux shunting members slidably disposed in said recess, each of said flux shunting members comprising a curved portion and an elongated rack portion having teeth thereon, a pinion disposed between said rack portions in operative engagement with said rack teeth, a cover plate of non-magnetic material mounted on said studs to extend over said recess, a bearing in said plate for pivotally supporting said pinion and a threaded retaining cap on the end of each stud to securely clamp said plate to hold said pinion and members in adjusted position.

4. In combination in an electrical instrument, a permanent magnet having pole portions for establishing a magnetic field of force in the air gap therebetween, a non-magnetic base, a recess in said base, flux-shunting members in said recess and adjusting means accessible external of the instrument for adjusting the position of said flux shunting members relative to the pole portions of the magnet to adjust the flux density of the field established in said air gap.

5. In combination in an electrical instrument, a permanent magnet, a pair of flux shunting members having rack teeth thereon, a pinion therebetween for moving said members toward or away from the pole portions of said magnet and means for securing said members in adjusted position.

6. In combination in an electrical instrument a U-shaped permanent magnet having pole portions, a non-magnetic base, threaded studs of magnetic material extending through said pole portions and said base, a threaded retaining cap of magnetic material on the end of each stud, a recess in the back surface of said base extending between and around said studs, a pair of flux shunting members slidably disposed in said recess, each of said flux shunting members comprising a curved portion and an elongated rack portion having teeth thereon, a pinion disposed between said rack portions in operative engagement with said rack teeth for moving said flux shunting members, a cover plate of non-magnetic material disposed over said recess and adjustable means for securing said cover plate to firmly clamp said shunting members in said recess.

7. In combination in an electrical instrument, a permanent magnet having adjacent pole portions defining an air gap, a base of non-magnetic material, means for securing said magnet to said base, and means carried by said base and cooperating with said securing means for adjustably shunting a portion of the flux of said magnet through said securing means and around said air gap.

FERNALD S. STICKNEY.